UNITED STATES PATENT OFFICE.

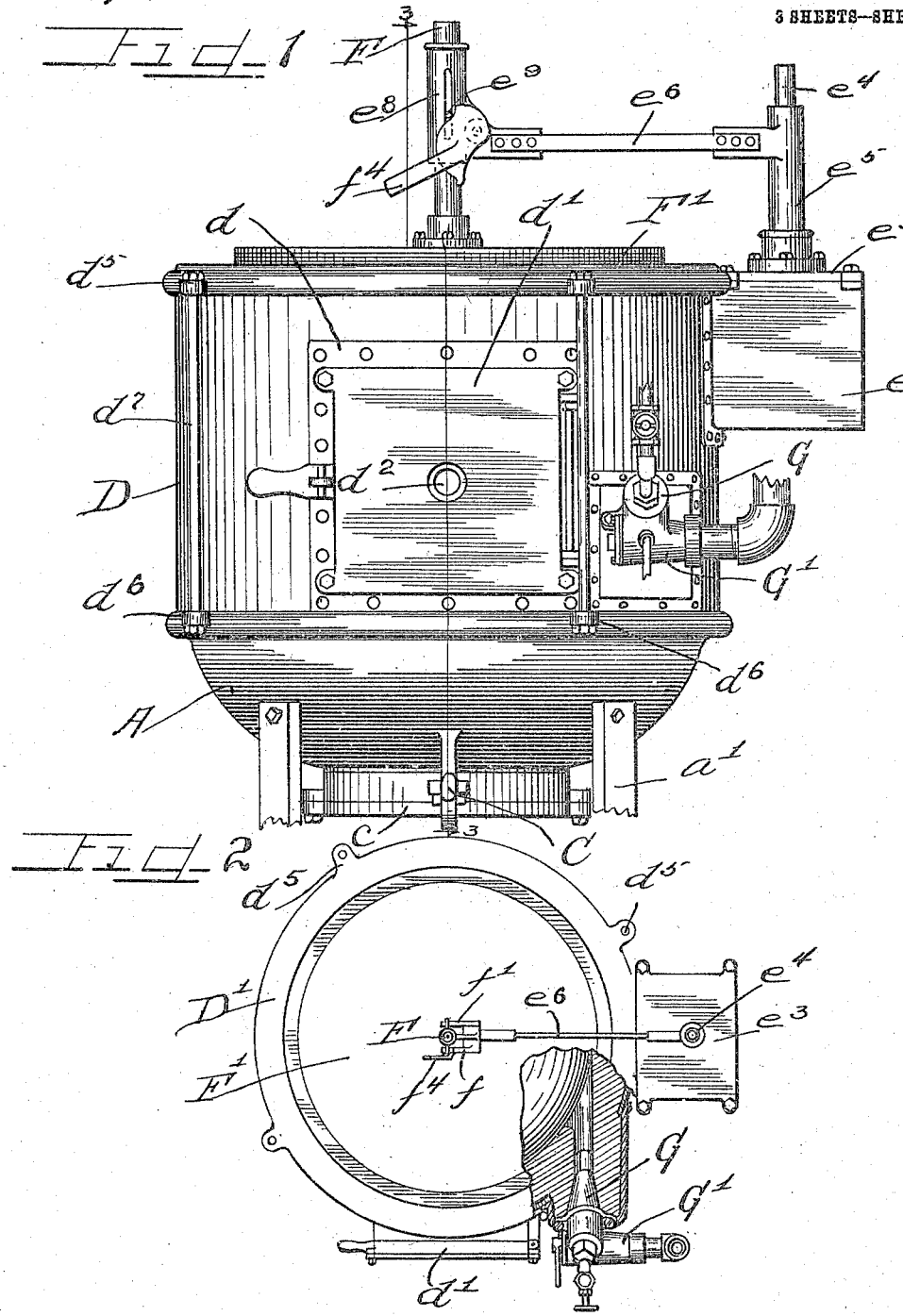

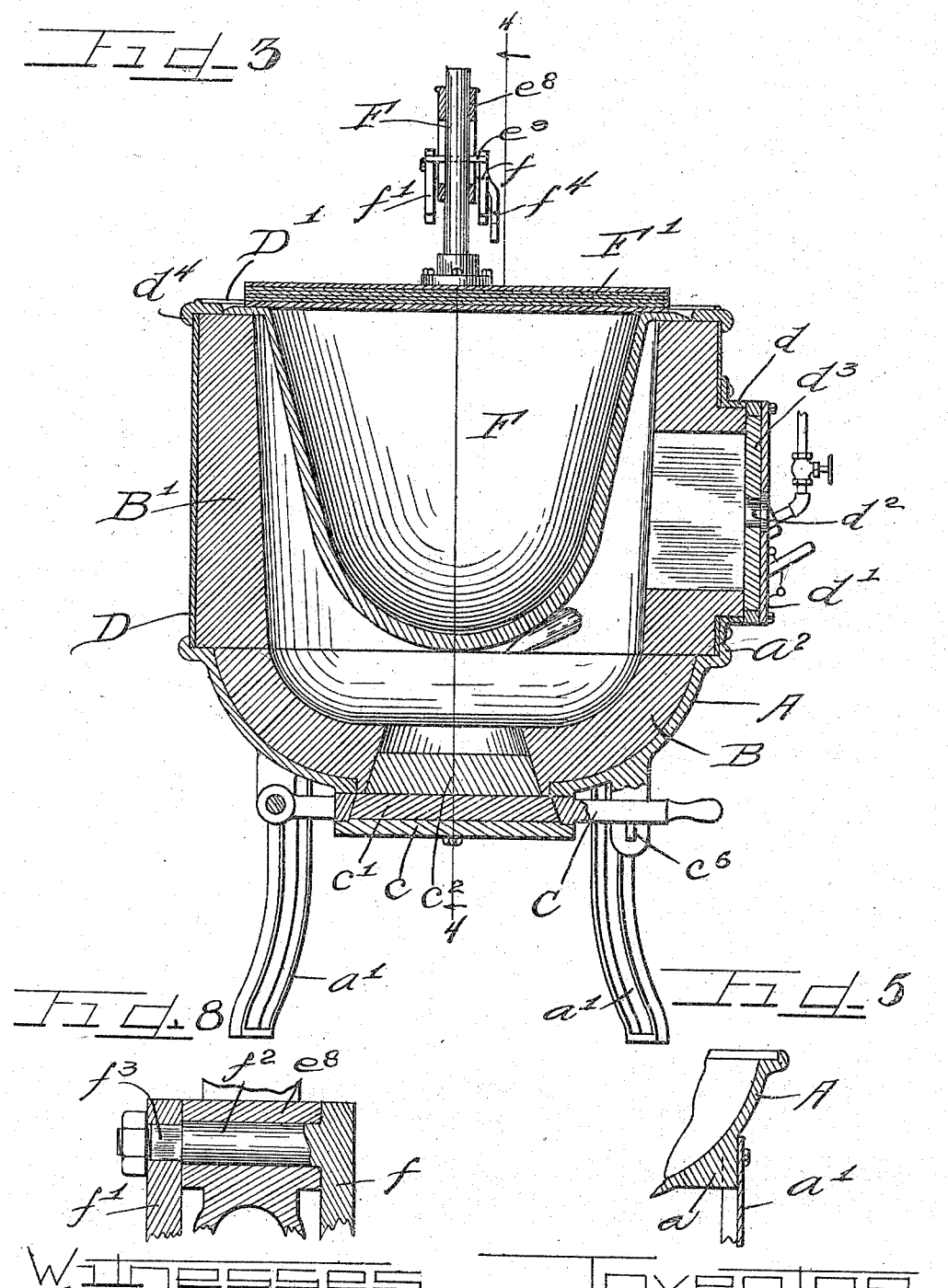

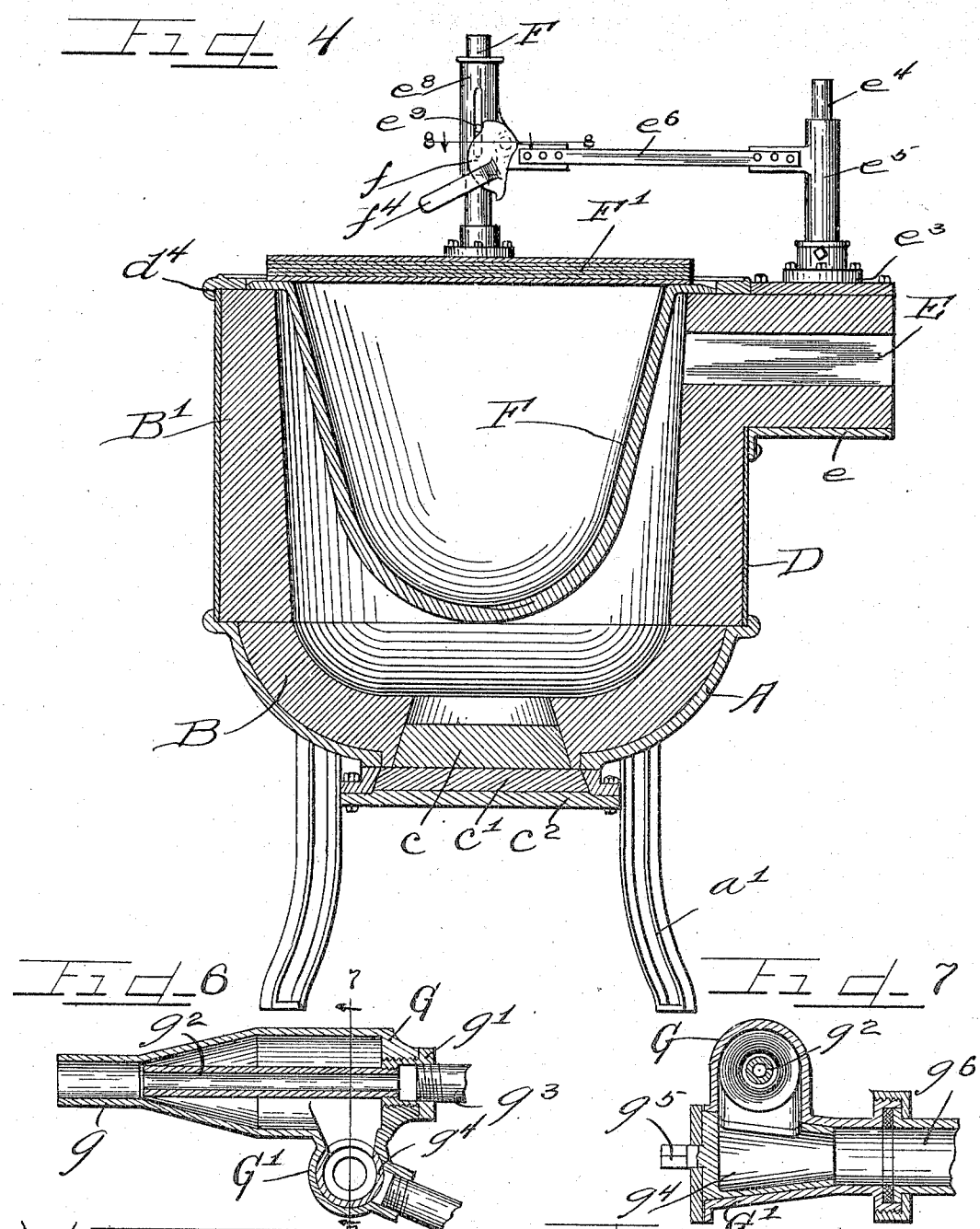

ALFRED FISHER, OF CHICAGO, ILLINOIS.

FURNACE.

957,873.  Specification of Letters Patent.  Patented May 17, 1910.

Application filed October 26, 1908. Serial No. 459,501.

*To all whom it may concern:*

Be it known that I, ALFRED FISHER, a citizen of the United States, and a resident of the city of Chicago, Cook county, Illinois, have invented certain new and useful Improvements in Furnaces; and I do hereby declare that the following is a full, clear, and exact description of the same, reference being had to the accompanying drawings, and to the letters of reference marked thereon, which form a part of this specification.

This invention relates to that class of furnaces adapted for the melting of metals or the like and generally known as "Pot furnaces."

Heretofore it has been practically unknown in the furnace art to secure a practically even distribution of heat to the pot, and in consequence to melt the charge, certain portions of the surface of the pot were subjected to a very much higher temperature than other portions, causing warping of the pot and soon destroying the same, but, what was more serious, causing the charge to heat unequally so that certain portions of the charge were subjected to an unnecessarily high temperature while other portions were subjected to a temperature hardly sufficient to melt the same. This difficulty of suitably distributing the heat to the pot has caused such furnaces to be used much less than their real merit (when properly constructed) would otherwise have insured.

It is an object of this invention to afford a pot furnace adapted to be heated by any suitable hydro-carbon or fluid fuel, and so constructed as to insure the heating of the entire pot to practically uniform temperature by means of an ascending spiral flame, which surrounds and invests all parts of the pot, heating all portions thereof alike.

It is a further object of the invention to afford a construction in which a tight fitting cover is adjustably secured to removably cover the pot and is provided with means whereby the same may be elevated and swung away from the pot when desired with slight expenditure of strength.

It is a further object of the invention to afford a discharge opening in the bottom of the furnace normally closed by a door, and which may be opened to permit the discharge therefrom of the metal should a pot from any cause, break.

The invention consists in the matters hereinafter described and more fully pointed out and defined in the appended claims.

In the drawings: Figure 1 is a front elevation of the furnace embodying my invention. Fig. 2 is a reduced top plan view with one side broken away to disclose the burner. Fig. 3 is a section on line 3—3 of Fig. 1. Fig. 4 is a section on line 4—4 of Fig. 3. Fig. 5 is a detail section illustrating the attachment of the lugs with a portion of the casing. Fig. 6 is a longitudinal section of the discharge end of the burner. Fig. 7 is a section on line 7—7 of Fig. 6. Fig. 8 is a section on line 8—8 of Fig. 4.

As shown in the drawings: The furnace proper comprises an outer casing of metal and an inner lining of fire brick, in which is supported the pot to contain the metal to be melted. Said casing, as shown, comprises a bottom casting A, and is cup shaped in form to receive the correspondingly shaped fire brick lining B, which affords the bottom of the furnace. Said bottom casing member A, is provided with downwardly directed shoulders $a$, arranged approximately ninety degrees apart, and which afford attachment for the legs $a'$, as shown four in number, constructed by casting or otherwise to afford substantially a channel bar, one end of which fits on the shoulders $a$, and the other of which supports the device as a whole upon the floor. An enlarged aperture is provided in the bottom of the bottom casing member A, and pivotally supported on the rear legs of the furnace is a lever C, to which is bolted or otherwise secured a closing plate $c$, on which is secured filling blocks $c'$—$c^2$, of suitable fire brick and which, as shown, taper upwardly to fit in the aperture in the bottom of the casing.

The aperture in the bottom lining B, of fire brick is circular in form, located at the center thereof and tapers inwardly to afford a positive fit for the fire brick filling blocks $c^2$, as shown in Figs. 3 and 4. Said bottom casing member A, is provided at its periphery at the top thereof with an outwardly directed bead, affording an upwardly and inwardly directed lip $a^2$, and seated therein is the cylindric shell D, constructed of metal plates, and within which is fitted fire brick B', to afford the inner walls of the furnace and which flare slightly outward toward the top. Bolted on the front side of the shell D, is a metallic frame $d$, on which is hinged a door $d'$, provided with a central view aperture $d^2$, and as shown, said door is lined in its interior with fire brick $d^3$, which fits against the outwardly directed sides of the fire bricks which protrude to a greater or less extent through the door casing or frame $d$. A flue vent passage E, is provided at the top and one side of the furnace and is directed horizontally outward, the fire brick lining at that point being extended for that purpose, and bolted on the shell D, is a casing or frame of metal plates $e$, which serve to protect and support the fire brick walls of said passage. Fitted in said furnace and tapering downwardly from the top somewhat perpendicularly, is the pot or crucible F. This is constructed of metal, (usually iron), and is provided with a peripheral flange at its top, which seats on the fire brick surrounding the top of the furnace, effectually closing the furnace at its top and serving at all times to support the pot and its charge in the furnace. An annular band or top casing D', provided with a peripheral bead $d^4$, extends down over the casing D, and at its top rests on the fire brick and affords means for rigidly securing all parts of the furnace together, comprising apertured lugs $d^5$, which are arranged to register with corresponding lugs $d^6$, in the bottom casing member A, and through which extend bolts $d^7$, as shown four in number, although any desired number may be used to serve to bind the structure as a whole, together.

Supported on the top plate $e^3$, of the flue or vent casing is a mast or pivot pin $e^4$, and slidably and rotatably mounted thereon is a sleeve $e^5$, rigidly connected with which is an arm $e^6$, which extends approximately to a point above the center of the furnace and there is rigidly connected with a vertical sleeve $e^8$, provided on opposite sides with longitudinal slots to receive the elevating pins $e^9$, secured on a stem F. This stem, as shown, is bolted centrally on a cover F', constructed, as shown, of upper and lower plates of metal between which is provided asbestos insulation, which serves to confine the heat within the furnace, and, as shown, a double cam $f$—$f'$, is pivotally supported on the side arm or the side of the sleeve $e^8$, in position to engage the lifting pin $e^9$, to elevate the cover. As shown, the cam $f$, is provided with an integral stem $f^2$, which extends through a lug or projection on the side of said sleeve $e^8$, and at its outer end $f^3$ is squared, as shown in Fig. 8, to engage in a suitable seat in the cam $f'$, which is retained in place thereon by means of a suitable nut, as shown in Fig. 8. The cam $f^8$, as shown, is provided with an integral handle $f^4$, whereby the cams may be swung upwardly or downwardly to elevate or depress the cover and when elevated the cover may be swung to the right or left upon the mast or pivot pin $e^4$, to expose the entire top of the pot, if desired.

The burners may be one or more in number. If one, as shown in the drawings, said burner is located below the flue or vent opening and is directed tangentially with the inner wall of the furnace and downwardly to direct the blaze spirally beneath said vent opening and around the furnace and pot, and is located, as shown, between the door and said vent or flue. Of course, another burner may be introduced diametrically opposite and also is directed downwardly in the same manner.

The burner, as shown, comprises an outer casing G, which tapers toward its inner end to a discharge pipe $g$, which is laid in the brick work, and threaded into the larger end of the casing, is a fitting $g'$, threaded into the inner end of which is a fuel pipe $g^2$, of slightly less diameter than the discharge pipe $g$, and which extends approximately to the inner end of said discharge pipe or nozzle. In the outer end of the fitting $g'$, is threaded the supply pipe $g^3$, for the hydrocarbon fluid such as crude oil or other suitable materials. Arranged at one side of the casing G, and opening thereinto is an air valve casing G', having therein a rotative plug valve closure $g^4$, open at its inner end and on one side to communicate in the casing G, is provided on its outer end with a stem $g^5$, adapted to be engaged by a wrench or other means to adjust the same to a suitable air supply. As shown also, an air pipe $g^6$, communicates with the inner or open end of the plug valve closure and may be connected with any suitable source of air pressure, as, for instance, a blower, whereby the air supply is forced therethrough and through the casing G, and passing into the nozzle $g$, on all sides of the fluid pipe $g^2$, sprays the hydro-carbon fluid mixture therethrough into the combustion chamber of the furnace, as before described. Of course, any suitable valve is provided for controlling the supply of hydro-carbon or to regulate the relative flow of the hydro-carbon and air.

The operation is as follows: In charging the furnace, the cam lever $f^4$, is lifted, thereby elevating the cover, which may be then swung on the mast $e^4$, clear to the top of the pot into which the charge is inserted. The cover is then swung back over the pot and is lowered by means of the cam lever $f^4$, to entirely close and seal the same. The combustion is then started at the burner and the discharge nozzle being heated, because of the intense heat of the fire brick, perfect generation results and because of the arrangement of the air inlet with reference to the fuel supply, a perfect mixture results, which is forced in a steady blast into the furnace and tangentially downwardly against the inner wall thereof, the burning mixture during its combustion passing several times around the furnace in a spiral course, and thence outwardly through the flue. In consequence, the entire area of the pot is subjected to intense heat, not alone from the actual combustion of the mixture, but as well because of the intense heat due to the hot temperature attained by the fire brick and in consequence, the metal is melted uniformly and very quickly. Of course, the temperature may be perfectly regulated by the adjustment of the burner, and the melting having been completed, further combustion may be immediately discontinued by closing the supply valve during pouring.

Should it ever occur that a pot should be broken depositing in the bottom of the furnace the melted or partly melted metal, the furnace may be immediately cleared ready for the insertion of a new pot and a continuance of the use of the furnace by releasing the handle C, from its latch or support $c^6$, as shown in Fig. 3, thus opening the bottom of the furnace to permit the same being immediately cleared.

Of course, details of construction may be varied. I therefore do not purpose limiting this application for patent otherwise than necessitated by the prior art.

I claim as my invention:

1. The combination with a furnace of a metal pot supported therein, a flue leading from the top of the furnace, a blast burner below said flue positioned to direct its blast tangentially into the furnace, and a bottom door positioned to close an aperture in the bottom of the furnace through which may be removed any material in the fire pot.

2. The combination with a furnace of a metal pot supported therein, a flue leading from the top of the furnace, a blast burner below said flue positioned to direct its blast tangentially into the furnace, a bottom door positioned to close an aperture in the bottom of the furnace through which may be removed any material in the fire pot, a cover for the pot, and mechanism for lifting the same.

3. The combination with a furnace of a metal pot supported therein, a flue leading from the top of the furnace, a hydro-carbon blast burner below and at one side of said flue positioned to direct its heat tangentially and downwardly into the furnace, a bottom door positioned to close an aperture in the bottom of the furnace through which may be removed any material in the fire pot, and a side door opening into the furnace.

4. The combination with a pot shaped furnace, of a metal pot having a rim suspended from the top of the furnace by the rim, a cover for the pot, a flue leading from the top of the furnace, a blast burner positioned to direct its blast tangentially and downwardly into the furnace below the pot, and a bottom door positioned to close an aperture in the bottom of the furnace through which may be removed any material in the fire pot.

5. The combination with a pot shaped furnace open-topped, of a metal pot having a rim supported therein by its rim and closing the top, a flue leading from the top of the furnace, a hydro-carbon blast burner positioned at one side of and below said flue to direct its blast tangentially and downwardly into the furnace, a bottom door positioned to close an aperture in the bottom of the furnace through which may be removed any material in the fire pot, an insulating cover for the pot and mechanism for actuating the same.

6. The combination with a pot shaped furnace open at the top, of a metal pot having a rim supported therein by its rim and closing the top, a flue leading from the top of the furnace, a hydro-carbon blast burner positioned to direct its blast tangentially and downwardly into the furnace below and at one side of said flue, a bottom door positioned to close an aperture in the bottom of the furnace, a door in the side of the furnace, a cover for the pot, a standard supported on one side of the furnace, an arm journaled thereon, and a cam on said arm connected to lift the cover.

7. In a device of the class described a furnace having a rounded bottom, a pot supported therein and closing the furnace and a blast burner inclined to direct its blast on the bottom of the furnace from which the blast is deflected in a spiral course around the pot and a flue at the top of the furnace opening from the side.

8. A pot furnace having an aperture in its bottom, a door closing said aperture, a pot supported in the furnace and a burner for directing a blast downwardly into the furnace and tangentially of the pot.

9. In a device of the class described a furnace having a rounded bottom and walls tapering gradually outwardly from said bottom to direct the heat spirally around the furnace, a crucible suspended centrally in the furnace and a blast burner opening into the furnace.

10. In a device of the class described a furnace, a crucible suspended therein above the bottom of the furnace, a flue at the top of the furnace and a blast burner opening into the furnace directed transversely of the flue adapted to deliver a blast transversely of and below the flue.

11. A pot furnace comprising a furnace, a pot therein, said furnace having walls shaped to direct a blast spirally around the pot, a flue opening from one end of the furnace, a blast burner opening into the opposite end of the furnace necessitating the blast passing around the pot a plurality of times between the burner and flue, a casing inclosing the flue, a shaft secured to the casing and a cover for the pot pivotally connected to the shaft to swing laterally from the pot.

12. In a device of the class described a furnace, a pot supported therein having its bottom and side walls out of contact with the furnace, a blast burner for directing a blast into the furnace, a flue opening from the furnace at such a distance from the blast burner as to necessitate the blast passing around the pot a plurality of times before reaching the flue, a vertical shaft secured to the furnace, a cover for the pot, and means pivoted to the shaft and connected with the cover to elevate the cover from the pot and swing the cover laterally.

13. In a device of the class described a furnace comprising a bottom section having its inner wall concave, a side section removably secured to the bottom section, means rigidly clamping the sections together, a crucible in the furnace having its bottom and sides out of contact with the furnace, a blast burner opening into the furnace at one end of the crucible and a flue opening from the furnace at the opposite end of the crucible.

14. In a device of the class described a furnace provided with an opening in its bottom, a crucible therein having its bottom and sides out of contact with the furnace, a blast burner opening into the furnace at one end of the crucible, a flue opening from the furnace at the opposite end of the crucible, a cover closing the crucible pivoted to swing to expose the crucible and a tapered door for closing said opening in the bottom of the furnace.

15. In a device of the class described a furnace having a rounded bottom and side walls gradually tapering outwardly therefrom, a crucible depending into the furnace and providing a space between the bottom and sides thereof and the furnace, and a blast burner secured to the furnace to deliver a blast tangentially to the pot.

16. In a device of the class described a furnace having a rounded bottom and side walls gradually tapering outwardly therefrom, a crucible depending into the furnace and providing a space between the bottom and sides thereof and the furnace, a blast burner secured to the furnace to deliver a blast tangentially to the pot, and upon the rounded bottom of the furnace, said bottom adapted to deflect the blast in a spiral course around the pot, and a flue at the top of the pot.

17. In a device of the class described a furnace having the bottom on its inner side rounded and an opening in the bottom, side walls detachably secured to the bottom wall tapering slightly outwardly, a crucible having a rim to support itself in the furnace, a door for closing the opening in the bottom of the furnace, and a blast burner opening into the furnace.

18. In a device of the class described a furnace, a crucible therein shaped to close the top of the furnace, a pivotally supported cover adapted to rest on the crucible and close the same, means for elevating the cover and swinging the same to expose the crucible, said furnace having a tapered aperture in its bottom and a tapered door adapted to fit in said aperture and close the same.

In testimony whereof I have hereunto subscribed my name in the presence of two subscribing witnesses.

ALFRED FISHER.

Witnesses:
H. E. HANNAH,
J. W. ANGELL.